Figure 4:
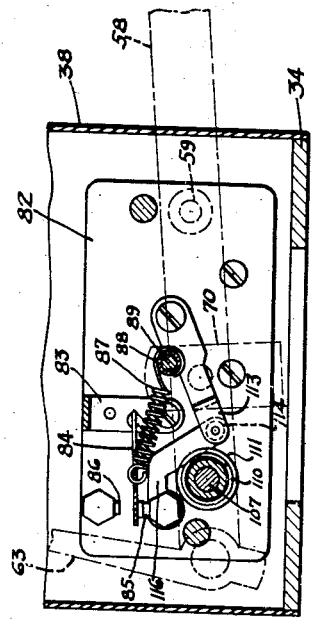

Sept. 1, 1936.  C. G. KRONMILLER  2,052,929
ELECTRICALLY OPERATED FLUID FLOW CONTROLLING MECHANISM
Filed Oct. 27, 1932    4 Sheets-Sheet 1

Inventor
CARL G. KRONMILLER
ATTORNEYS

Sept. 1, 1936.  C. G. KRONMILLER  2,052,929
ELECTRICALLY OPERATED FLUID FLOW CONTROLLING MECHANISM
Filed Oct. 27, 1932  4 Sheets-Sheet 2

Inventor
CARL G. KRONMILLER
By Paul, Paul & Moore
ATTORNEYS

Sept. 1, 1936.                C. G. KRONMILLER                2,052,929
          ELECTRICALLY OPERATED FLUID FLOW CONTROLLING MECHANISM
                    Filed Oct. 27, 1932        4 Sheets-Sheet 3

Inventor
CARL G. KRONMILLER
ATTORNEYS

Sept. 1, 1936.  C. G. KRONMILLER  2,052,929
ELECTRICALLY OPERATED FLUID FLOW CONTROLLING MECHANISM
Filed Oct. 27, 1932  4 Sheets-Sheet 4

Inventor
CARL G. KRONMILLER
By Paul, Paul & Moore
ATTORNEYS

Patented Sept. 1, 1936

2,052,929

UNITED STATES PATENT OFFICE 2,052,929

ELECTRICALLY OPERATED FLUID FLOW CONTROLLING MECHANISM

Carl G. Kronmiller, Minneapolis, Minn., assignor to Minneapolis-Honeywell Regulator Company, Minneapolis, Minn., a corporation of Delaware Application October 27, 1932, Serial No. 639,815

19 Claims. (Cl. 137—139)

The present invention relates to an improved mechanism for electrically operating a fluid flow controlling element such as a valve, damper or other similar device. More particularly the invention relates to improvements in fluid flow controlling devices of the type that are automatically moved to and maintained in one position against a biasing means upon the operative energization of suitable electrical apparatus and are moved to another position by the biasing means upon operative deenergization of the electrical apparatus for any reason, including a failure of the supply of electrical energy.

One of the prior art fluid flow controlling devices of the general character above referred to, is known as a "stalled motor" valve. In the stalled motor type of valve, the valve is normally biased to closed position by any suitable means such as a coiled compression spring. A rotary electrical motor is connected to the valve by suitable mechanism including a reduction gear train. When the motor is energized, the valve is opened against its bias, and when the valve has been completely opened, the motor stalls and thereby maintains the valve in its opened position. When the motor is deenergized the valve is closed by its biasing means which rotates the motor and reduction gear train in the reverse direction.

The power which is consumed during the time such a valve is held open by the stalled motor generates heat which is directly transmitted to the motor bearings causing them to tend to stick. As a result, the valves do not always close when the motor is deenergized, although they are intended to close under the action of the biasing means which is supposed to rotate the reduction gear train and motor in the reverse direction.

In another type of prior art device, a biased valve is moved to open position by a rotary electrical motor through a reduction gear train and an electrically operated device which when energized constitutes a part of the connection between the motor and valve. In this prior art type of device the valve is moved to closed position by its biasing means when the electrically operated device is deenergized, such deenergization serving to lengthen the connection between the motor and valve whereby the valve moves to closed position but the motor and reduction gear train remain stationary.

One of the broader aspects of the present invention is the provision of a fluid flow controlling element which is normally biased to one position, an electrical actuator including a reduction gear train which moves the biased fluid flow controlling element to a new position by means of an operative connection between the actuator and fluid flow controlling element and an electrically operated device, such as an electric magnet, which when operatively energized maintains the fluid flow controlling element in its new position after having been moved thereto by the actuator, the actuator moving the fluid flow controlling element to its new position independently of the electrically operated device. The expression "independently" as herein used means that the electrically operated device does not form a part of the moving connection between the actuator and the fluid flow controlling element so that the former would be capable of moving the latter to its new position even though the electrically operated device should be omitted. The actuator and electrically operated device are preferably connected to a common source of power so that if the supply of power should fail or be otherwise interrupted the biased fluid flow controlling element will automatically move to its original or first position and rotate the reduction gear train and actuator in a reverse direction.

Specifically the invention also includes switching mechanism associated with the fluid flow controlling element in such a manner that only the actuator may be operatively energized when the fluid flow controlling element is in its original or first position, the switching mechanism being operated upon movement of the fluid flow controlling element to its new position to operatively energize the electrically operated device or magnet and to operatively deenergize the actuator whereby the fluid flow controlling element will be maintained in its new fluid flow controlling position after operative deenergization of the actuator. Upon subsequent operative deenergization of the magnet for any reason, such as a failure in the supply of electrical power, the fluid flow controlling element is moved to its original position by its biasing means. The magnet may be of relatively small size and consequently consumes only a small amount of power which generates very little heat. This is particularly true if the magnet cooperates with the reduction gear train at a point near its connection with the motor since the power required of the magnet will be small because of the large mechanical advantage available through the gear train. In addition, the magnet may be located at a point removed from the motor bearings so that any heat which it may generate will not be directly transmitted to the motor bearings.

Another of the important features of the invention is the provision of means for disconnecting part of the reduction gear train from the biased fluid flow controlling element and preventing reverse rotation of the remaining portion of the gear train by a magnet or other electrical device. That is to say, the fluid flow controlling element is moved to a predetermined position against its bias by an electrical motor as hereinabove described. When the fluid flow controlling element has reached its new position, the magnet is operatively energized to maintain the fluid flow controlling element in its new position, the motor is operatively deenergized, and the reduction gear train is broken at some point between the motor and the magnet. On operative deenergization of the magnet, the biased fluid flow controlling element only needs to rotate a part of the reduction gear train in the reverse direction. This construction eliminates the possibility of trouble from sticky motor bearings. In addition, if, by any chance, excessive friction should develop in that portion of the reduction gear train which is not disconnected from the motor, the whole force of the biasing means will be available to overcome this friction. Furthermore, the motor being at the end of a reduction gear train, any friction at the motor requires the use of more power to overcome it than if the friction were present further along in the gear train. As a result, the disconnection of part of the gear train greatly increases the reliability of operation of the fluid flow controlling element by its biasing means.

Past experience has shown that when a valve of the above mentioned type moves to closed position, its movement is so suddenly stopped that if the reduction gear train and other parts are permanently connected thereto, the valve rebounds from its seat. This is a very serious condition if the valve is controlling the flow of gas to a burner, for instance. It has therefore been proposed to provide an over-riding connection, or one-way connection, or even a lost motion connection between the valve and the reduction gear train so that the reduction gear train may continue rotating until its momentum is expended after the valve has been closed by the biasing means.

A further object of the invention is the provision of an improved and simplified, commercially feasible connection between a fluid flow controlling element, such as a valve, and a reduction gearing therefor, the connection being such as to allow continued rotation of the reduction gear train after the valve has seated.

Still another object of the invention is the provision of means whereby a fluid flow controlling element, such as a valve, may be manually moved to and latched in a partial open position upon a failure in electrical power and will resume automatic operation upon a restoration of electrical power.

Another object of the invention resides in a general improvement throughout the fluid flow controlling element operating mechanism.

Figure 5:
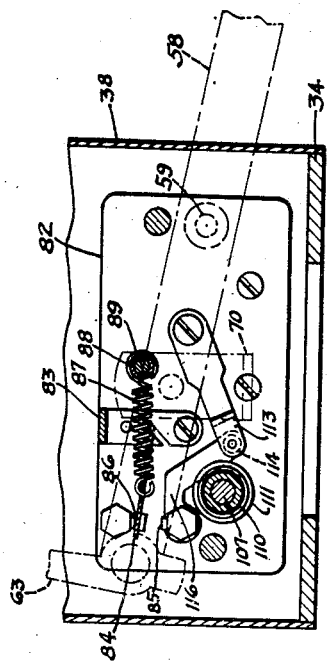
Figure 1:
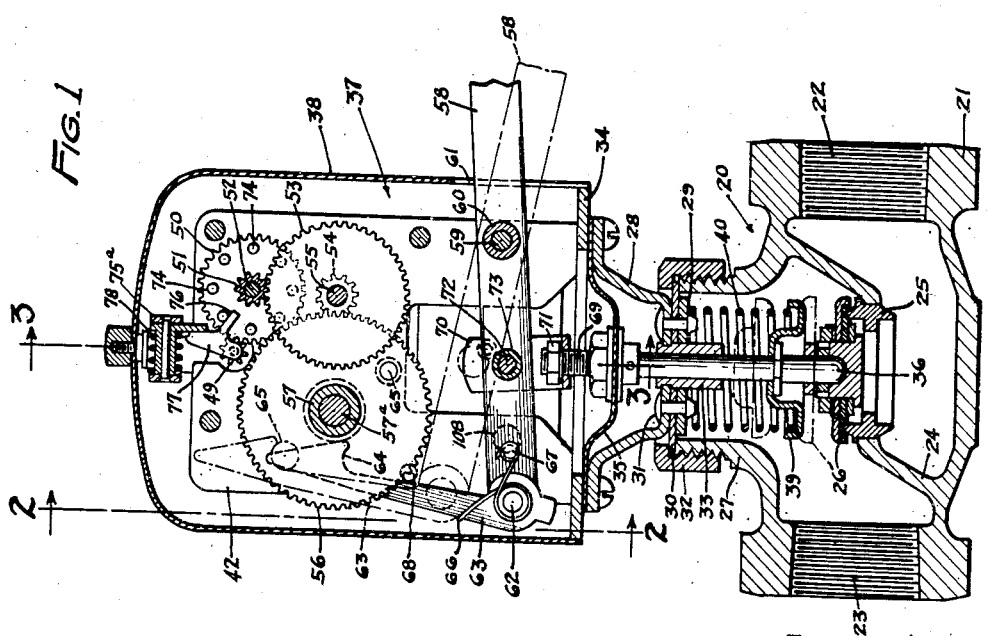
Figure 3:
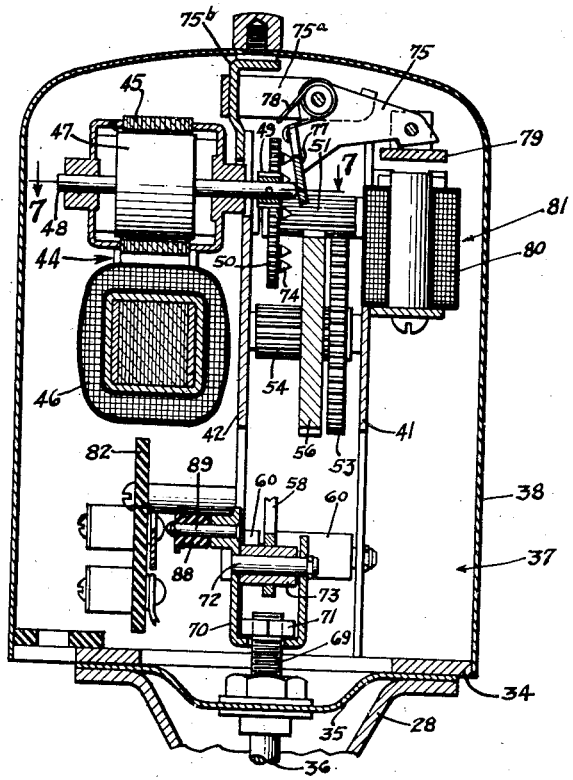
Figure 2:
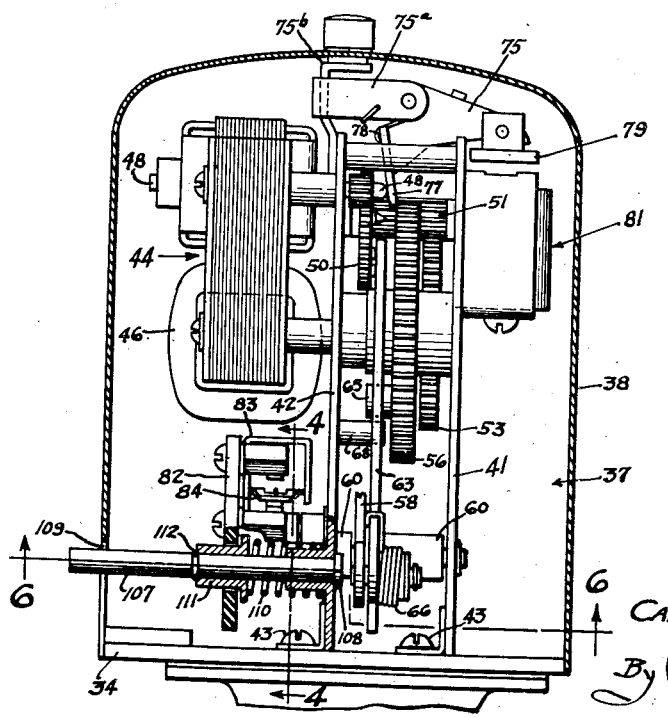
Figure 7:
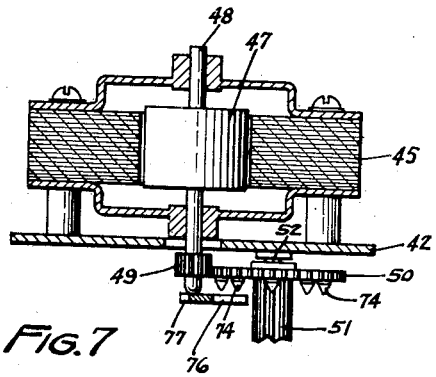
Figure 8:
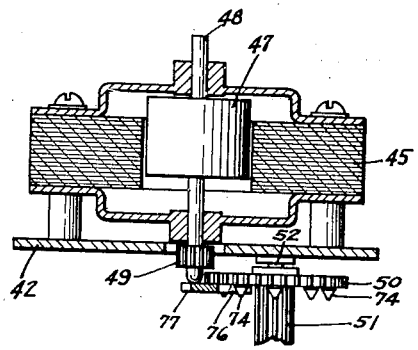
Figure 6:
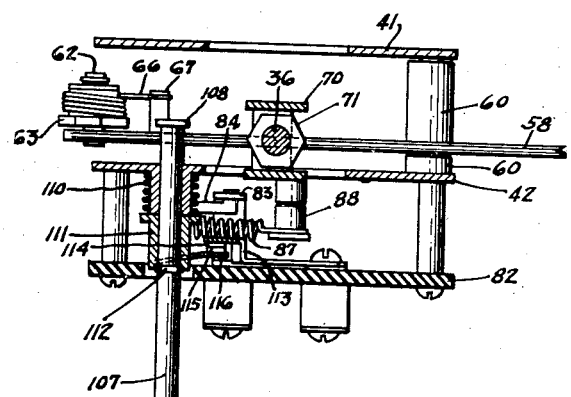
Figure 9:
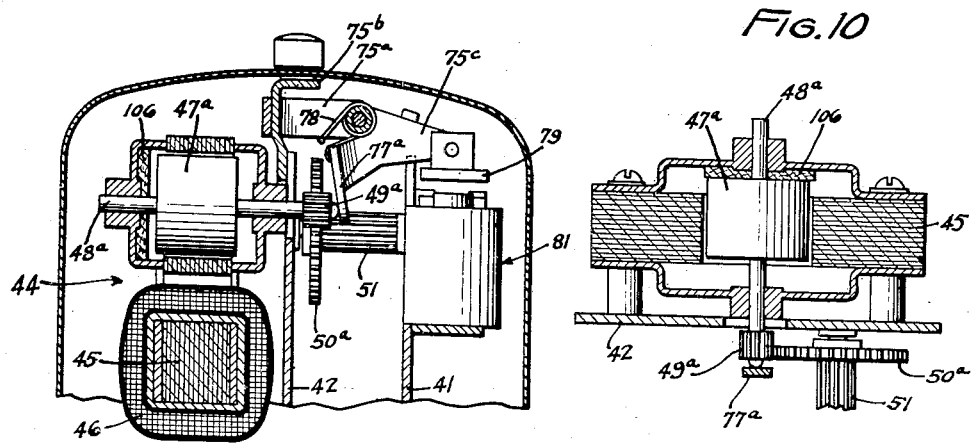
Figure 10:
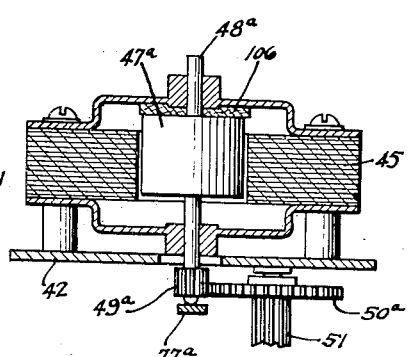
Figure 12:
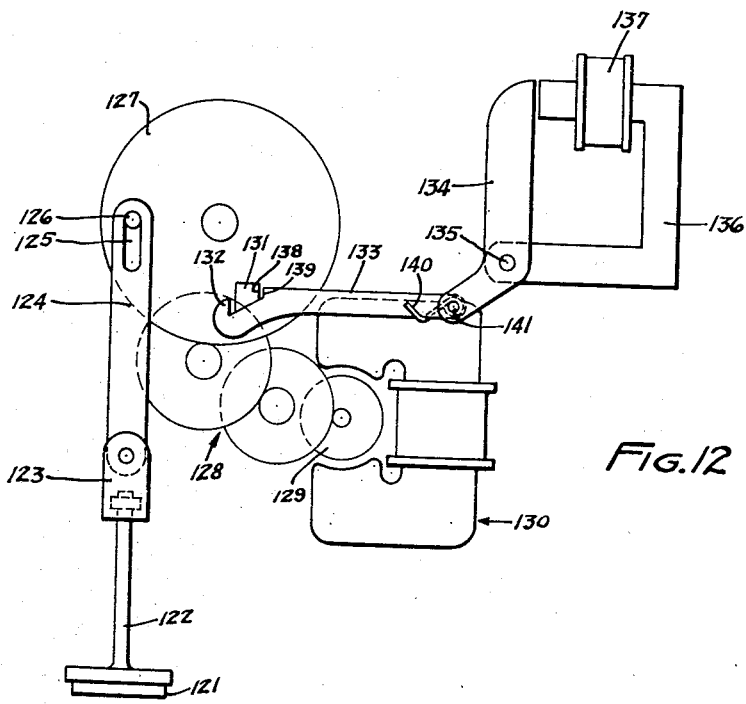
Figure 11:
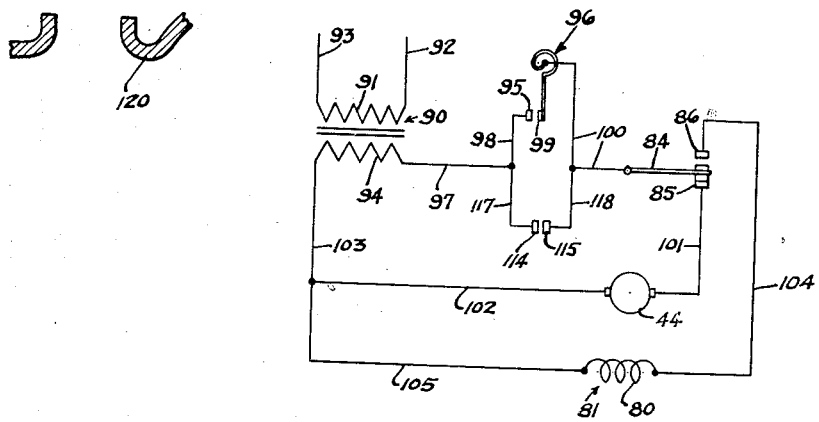

For a more complete understanding of the invention, reference may be had to the following description and accompanying drawings, in which;

Fig. 1 is a longitudinal cross-sectional view through a valve built in accordance with the present invention, the valve being shown by full lines in closed position and by dotted lines in open position, Fig. 2 is a sectional view taken about on line 2—2 of Fig. 1, Fig. 3 is a sectional view taken about on line 3—3 of Fig. 1, Fig. 4 is a sectional view taken about on line 4—4 of Fig. 2, Fig. 5 is a view similar to Fig. 4 but with the parts shown in the position they assume when the valve is open, Fig. 6 is a sectional view taken about on line 6—6 of Fig. 2 but with the valve manually latched in a partial open position after a power failure, Fig. 7 is a sectional view taken on about line 7—7 of Fig. 3 and shows the electric magnet and associated parts in the position they occupy when the magnet is deenergized, Fig. 8 is a view similar to Fig. 7 but with the magnet energized, Fig. 9 is a view with parts in section showing a modified mechanism for preventing rotation of the gear reduction train under certain conditions, Fig. 10 is a partial view showing the position of some of the parts of Fig. 9 when the electric magnet is energized, Fig. 11 is a schematic diagram of the manner in which the electrical connections are made between the various electrical devices, and Fig. 12 is a schematic view of a further modification.

Referring to the drawings, and more particularly to Figs. 1 to 8 inclusive, the fluid flow controlling element is herein illustrated as a valve, generally indicated at 20, which comprises a casing 21 that is provided with an inlet port 22, and outlet opening 23 and a partition wall 24 between the inlet port 22 and outlet opening 23. The partition 24 is provided with an opening which receives a valve seat 25 upon which the valve disc 26 is adapted to seat. The valve casing 21 is formed with an upwardly extending externally threaded cylindrical portion 27. A cup member 28 and a spring retainer 29 are secured to opposite sides of a disc 30, by any suitable means, such as the rivets 31. A bonnet member 32 which is internally threaded cooperates with the threads of cylindrical portion 27 in clamping disc 30 against the end of cylindrical portion 27 to form a fluid tight joint. A bushing 33 extends through cup member 28, disc 30, spring retainer 29, and into the valve casing 21. An annulus 34 clamps a sealing-off diaphragm 35 against cup member 28. A valve stem 36 carries valve disc 26 at its lower end, extends through bushing 33 and diaphragm 35, and terminates within a control casing 37 which is formed by the annulus 34 and a cover 38. The diaphragm 35 is secured to valve stem 36 in any suitable fluid tight manner. The valve stem 36 carries a spring retainer 39 against which one end of a compression spring 40 abuts and the other end thereof abuts against spring retainer 29. The mechanism thus far described constitutes a fluid flow controlling mechanism which includes a fluid flow controlling element that is biased to its minimum flow or closed position by the compression spring 40.

Within the control casing 37 is a pair of vertically extending plates 41 and 42 respectively which are carried by and secured to the annulus 34 in any suitable manner, such as by the screws 43. A rotary electrical motor of the induction type generally indicated at 44 is secured to plate 42 in any usual manner and comprises a laminated field 45 which is provided with a field coil 46 and a rotor 47 mounted upon a rotor shaft 48 which extends into the space between plates 41 and 42 and has a pinion 49 secured to it. Pinion 49 meshes with a gear 50 which is secured to a pinion 51 both of which are mounted upon a shaft 52 that is journalled in plates 41 and 42. The pinion 51 in turn meshes with a gear 53 which is secured to a pinion 54 both of which are mounted upon a shaft 55 that is journalled in plates 41 and 42. Pinion 54 meshes with a gear 56 which is provided with an enlarged hub 57 that is journalled upon a shaft 57a which is also mounted in plates 41 and 42. The gears and pinions 49, 50, 51, 53, 54, and 56 comprise a gear reduction which reduces the high speed of rotor 47 to such a point that gear 56 rotates relatively slowly.

A lever 58 is pivoted at a point within the control casing 37 upon a shaft 59 which is mounted in plates 41 and 42. Spacing sleeves 60 which are placed upon shaft 59 maintain the lever 58 in its proper spaced relation to plates 41 and 42. The lever 58 extends outside the control housing 37 through an opening 61 in cover 38 and may be utilized for controlling an auxiliary device as will be hereinafter explained. The other end of lever 58 terminates within the control casing 37 and carries a pin 62 upon which is pivoted a link 63 which extends upwardly into the control casing 37 in close proximity to the gear 56 and terminates in a hook 64 which is adapted to be engaged by a pin 65, under certain conditions, which is carried by and projects laterally from the gear 56 at a point removed from its axis of rotation. A spring 66 has one of its ends hooked around link 63, is then coiled about pin 62 and has its other end hooked around a pin 67 carried by lever 58. This spring 66 tends to constantly rotate link 63 in a clockwise direction as viewed in Fig. 1 in order that the hooked end 64 of link 63 will always be in such a position as to be readily engaged by pin 65. A pin 68 which is secured to plate 42 extends into the path of rotation of link 63 to limit its rotative movement. The upper end of valve stem 36 is threaded as indicated at 69 and loosely receives a U shaped bracket 70 which is held in position thereon by a nut 71. The bracket 70 receives lever 58 between its legs and a pin 72 passes through the legs of bracket 70 and journals a bushing 73 which is pivoted on lever 58.

With the mechanism thus far described, if the field coil 46 of motor 44 be energized, gear 56 will be rotated in a clockwise direction as viewed in Fig. 1 by means of the reduction gear train above described and pin 65 will engage the hooked end 64 of link 63 to rotate lever 58 about its pivot and move valve disc 26 away from valve seat 25 against the bias of coil spring 40. If the fluid flow controlling mechanism 20 is being used to control the flow of gas to a conversion burner, for instance, the outer free end of lever 58 may be used for controlling the secondary air damper. It will be readily observed that as the valve disc 26 moves away from and toward the valve seat 25, the outer free end of lever 58 will move down and up and this motion may of course be utilized to control some other device whose movement should be synchronized with the valve disc 26. If the field coil 46 is now deenergized, the compression spring 40 will quickly move valve disc 26 into engagement with valve seat 25. This movement will pull link 63 in a downward direction rotating gear 56 and the associated gears and motor rotor 47 in the reverse direction. This closing of the valve takes place so quickly under the action of compression spring 40 that the various gears and motor rotor 47 are turned in the reverse direction at a considerable speed and will build up a large amount of momentum. If the gear 58 were connected directly to link 63, valve disc 26 when it struck the valve seat 25 would have a tendency to rebound and again open the valve a small amount for a short period. Such a bouncing of valve disc 26 on its valve seat 25 is objectionable particularly when the valve is controlling the supply of gas to a heater. The pin 65 and hooked end 64 of link 63, however, form what might be termed a one-way connection so that the various gears may continue to rotate after the valve has seated. If the momentum thus built up is so great as to cause gear 56 to make more than a complete revolution, the pin 65 will engage the end of link 63 and move it out of the way against the action of spring 66 allowing the gear 56 to continue rotating.

The preferred mechanism for maintaining the valve in open position after it has been moved thereto will now be described. The gear 50 is provided with a plurality of cone shaped projections 74 which project laterally from the gear 50 at points which are removed from the axis of rotation of the gear 50. A latching mechanism 75 is pivoted to a U shaped bracket 75a which is carried by a member 75b secured to plate 42. The latching mechanism 75 is provided with a latch 76 and a plate 77, the former of which is adapted to move into the path of the projections 74 and the latter of which is adapted to engage the end of rotor shaft 48 to disengage pinion 49 and gear 50 when the latching mechanism 75 is rotated in a clockwise direction about its pivot as viewed in Figs. 2 and 3. A spring 78 constantly tends to rotate latching mechanism 75 to its inoperative position. Pivotally suspended from latching mechanism 75 is an armature 79 by which latching mechanism 75 is rotated to latching position upon the energization of a coil 80 of an electric magnet 81 which is secured to plate 41.

A sheet of insulating material 82 is secured to plate 42 in spaced relation thereto and carries a U shaped bracket 83 in which is pivoted a switch arm 84 that is adapted to alternately engage stationary contacts 85 and 86 mounted upon the insulating sheet 82. An over-center spring 87 has one of its ends secured to switch arm 84 and its other end secured to an insulating bushing 88 which is mounted upon a pin 89 that is carried by bracket 70. When the valve is closed the spring 87 holds switch arm 84 in engagement with contact 85 and when the valve has been moved to its full open position spring 87 passes through the pivotal point of switch arm 84 and moves it from engagement with contact 85 into engagement with contact 86 with a snap movement. Fig. 4 shows the position of these parts when the valve is closed and Fig. 5 shows their position when the valve is open.

Referring now to Fig. 11 a step-down transformer shown at 90 is provided with a high voltage primary 91 that is connected to line wires 92 and 93. The step-down transformer is provided with a low-voltage secondary 94 one side of which is connected to one contact 95 of any suitable type of automatic switch, such as a room thermostat generally indicated at 96, by wires 97 and 98. The other contact 99 of the room thermostat 96 is connected to switch arm 84 by wire 100. Contact 85 is connected to the field coil 46 of motor 44 by wire 101 and the field coil 46 of motor 44 is also connected to the other side of secondary 94 by wires 102 and 103. Contact 86 is connected to one end of coil 80 of the electric magnet 81 by wire 104 and the other end of coil 80 is connected to wire 103 by wire 105.

If the room thermostat 96 should close contacts 95 and 99, an energizing circuit for motor 44 will be established as follows: secondary 94, wire 97, wire 98, contact 95, contact 99, wire 100, switch arm 84, contact 85, wire 101, motor 44, wire 102, and 103 to secondary 94. Energization of motor 44 will open the valve through the reduction gear train, link 63 and lever 58 as above described. When the valve has reached its full open position, switch arm 84 will be snapped from engagement with contact 85 and into engagement with contact 86. This will deenergize motor 44 and substantially instantaneously energize the coil 80 of electric magnet 81 by a circuit which is as follows: secondary 94, 97, 98, 95, 99, 100, 86, contact 86, wire 104, coil 80, wire 105, and 103 to 94. Energization of electric magnet 81 will attract armature 79 and rotate latching mechanism 75 about its pivot to move latch 76 into the path of projections 74 and to cause plate 77 to move rotor shaft 48 longitudinally until pinion 49 disengages gear 50. When motor 44 was deenergized as above explained spring 40 will try to move valve disc 26 downward into engagement with valve seat 25 and to rotate the reduction gear train in the reverse direction, but this will be prevented by the moving of latch 76 into the path of some one of the projections 74. When the room thermostat opens contacts 95 and 99 coil 80 of electric magnet 81 will be deenergized and spring 78 will move latching mechanism 75 to the position shown in Figs. 3 and 7 removing latch 76 from the path of the projections 74 and moving plate 77 from engagement with rotor shaft 48. The spring 40 will now move valve disc 26 into engagement with valve seat 25 and rotate the various gears in the reverse direction as previously explained. The motor rotor 47, however, will not be rotated since pinion 49 has been moved out of mesh with gear 50. It will be noted by reference to Fig. 8 that the motor rotor 47 has been moved somewhat out of alignment with the laminated field 45. When the circuit to motor 44 is next energized, the magnetic flux set up in laminated field 45 will pull rotor 47 into alignment and the pinion 49 will again engage gear 50.

A slight modification in the mechanism for preventing reverse rotation of the gear reduction train and associated parts upon deenergization of motor 44 when the valve is open is shown in Figs. 9 and 10. In this modification the gear 50a is not provided with any projections and the pinion 49a is made somewhat wider than the pinion 49 in the preferred construction. The latching mechanism 75c is provided with a plate 77a which is adapted to engage the end of rotor shaft 48a and move rotor 47a into engagement with a braking disc 106. This movement of rotor shaft 48a is not sufficient to disengage pinion 49a from gear 50a. In this modification, when the valve has been moved to open position the motor is deenergized and the electric magnet is energized as heretofore explained in connection with the preferred construction. Latching mechanism 75c moves plate 77a into engagement with rotor shaft 48a so as to move rotor 47a against brake disc 106. Rotor 47a is therefore prevented from rotating and since pinion 49a is still in engagement with gear 50a the valve is maintained in open position. When the electric magnet is deenergized rotor 47a is no longer forcibly held against brake disc 106 and the spring 40 is then free to brake the gear reduction train and the rotor 47a in the reverse direction to close the valve.

Sometimes the supply of electrical power will fail when the valve is open. From the above description, it will be obvious that under such conditions the valve will close. It is desirable when there is a power failure to be able to open the valve manually and latch it in open position in such a manner that if the power should return, the valve will again be put under automatic electrical control. The mechanism for obtaining these features will now be described. Referring particularly to Figs. 2 and 6 it will be seen that a pin 107 which is provided with an enlarged head 108 is journalled in plate 42, extends through insulating sheet 82 and extends without the control case 37 through an opening 109 in the cover 38. A coil spring 110 has one of its ends abutting plate 42 and its other end abutting an insulating bushing 111 which is mounted on pin 107 and prevented from longitudinal movement thereon by a clip 112. A contact arm 113 having a contact 114 is secured to insulating sheet 82. A cooperating contact 115 which is carried by a cooperating contact arm 116 is adapted to be moved into engagement with contact 114 upon inward movement of pin 107. If the power should be off and it is desired to open the valve in such a manner that it will automatically return under automatic control when power is resumed, the extended end of lever 58 is manually pushed down to open the valve and pin 107 is pushed in until it is in the path of movement of lever 58 so as to prevent reclosing of the valve by spring 40. The spring 110 tends to move pin 107 to its original position but this is prevented by the enlarged head 108 engaging the side of lever 58. When the parts have been so operated manually, the valve is in a partially open position and contact 115 is in engagement with contact 114. Referring to Fig. 11 it will be noted that contact 114 is connected to wire 97 by a wire 117 and contact 115 is connected to wire 100 by a wire 118. Contacts 114 and 115 are therefore in shunt relationship with contacts 95 and 99. Now, if the power should return, there will be an energizing circuit for motor 44 similar to that above set out, but by way of contacts 114 and 115 instead of contacts 95 and 99. Energization of motor 44 will open the valve further and lift lever 58 out of engagement with the enlarged head 108 of pin 107. The spring 110 will therefore return pin 107 to the position of Fig. 2 wherein it will be out of the path of movement of the lever 58 and contacts 114, 115 will be opened. If contacts 95 and 99 are closed at this time, due to the room being cold, the motor 44 will continue to open the valve, after contacts 114 and 115 have opened, until the switch arm 84 is snapped from engagement with contact 85 and into engagement with contact 86 whereupon the valve will be maintained open by the energization of the coil 80 of electric magnet 81 as above brought out. If, however, contacts 95 and 99 are separated, the opening of contacts 114 and 115 will prevent the continued energization of motor 44 and the valve will return to closed position ready for further automatic operation.

A further modification showing another manner in which a fluid flow controlling element may be maintained in a new position after having been moved thereto is shown in Fig. 12. Referring to Fig. 12, a portion of a valve casing is shown at 120. A valve disc 121 which is carried by a valve stem 122 is adapted to seat on the valve casing 120 under the influence of a biasing means (not shown). The upper end of valve stem 122 is connected to a bracket 123 to which one end of a link 124 is pivoted. The other end of link 124 is provided with a lost motion connection in the form of an elongated slot 125 which receives a pin 126 carried by a gear 127 at a point removed from its axis of rotation. The gear 127 is a part of a reduction gear train generally indicated at 128 which connects gear 127 with the rotor 129 of a rotary electrical motor generally indicated at 130. When the motor 130 is energized, gear 127 is rotated in a clockwise direction (as viewed in Fig. 12) and pin 126 engages the upper end of the slot 125 in link 124 to lift valve disc 121 away from valve casing 120 to open the valve. In Fig. 12 the parts are shown with the valve in open position.

The gear 127 carries a somewhat square shaped pin 131 removed from its center of rotation, which, during opening movement of the valve disc 121, engages the hooked end 132 of a link 133 the other end of which is pivoted to an armature 134. The armature 134 is pivoted at 135 on one leg of a core 136 of an electric magnet which is provided with an energizing coil 137. When the armature 134 has been so moved it is held in the position shown by the energization of coil 137 and one of the flat sides 138 of pin 131 abuts a flat portion 139 of the link 133 whereby the valve is maintained open independently of the motor 130 as long as coil 137 is energized. When the coil 137 is deenergized, and if motor 130 is also deenergized, the biasing means (not shown) will move valve disc 121 to closed position rotating gear 127 in a counter-clockwise direction whereupon link 133 will be moved in such a manner as to move armature 134 to its open position. A spring 140 constantly tends to rotate link 133 about its pivot 141 in a clock-wise direction whereby hooked end 132 of link 133 will always be maintained in engagement with pin 131. When the valve disc 121 is again moved to its open position, the armature 134 will again be brought to the position shown in Fig. 12 for the purpose of maintaining the valve disc 121 in its open position as above described. Obviously, the motor 130 and the coil 137 may be operatively energized and deenergized at the proper and desired times in any suitable manner such as by the switching mechanism heretofore described in the preferred construction.

From the above description, it will be apparent that the present invention provides a novel and improved manner of maintaining a biased fluid flow controlling element in one position after the same has been moved thereto by a rotary motor and reduction gear train against its bias. The invention further provides for disconnecting a portion of the gear train under certain conditions to render the operation of the fluid flow controlling element by its biasing means more reliable. The invention also provides specific improvements in the one-way connection between the fluid flow controlling element and the reduction gear train, in the recycling mechanism and in the general construction.

While specific embodiments of the invention have been herein described, it is to be understood that many changes in details could easily be made, and I intend to be limited only in the purview of appended claims.

I claim as my invention:

1. A device of the class described, comprising, in combination, a fluid flow controlling element biased to one position, an electrically operated actuator, a plurality of intermeshing gears operatively connecting the former to the latter through a one way connection, a plurality of elements secured to and projecting laterally from one of said gears between said one way connection and said actuator, a latch movable into the path of said projecting elements, said projections being circumferentially spaced so that regardless of the position of the gear to which they are secured, one of said elements is in a position wherein it will be engaged by said latch upon a relatively slight movement of said gear when said latch is moved to latching position, an electrically operated device for moving the latch to latching position, and switching means associated with the fluid flow controlling element for operatively energizing the electrically operated device and operatively deenergizing the electrically operated actuator when the latter upon energization has moved the fluid flow controlling element to a new position against its bias.

2. A device of the class described, comprising, in combination, a fluid flow controlling element biased to one position, an electrically operated actuator, a plurality of intermeshing gears operatively connecting the former to the latter whereby the former is moved to a new position against its bias upon energization of the latter, means for unmeshing two of said gears and preventing rotation of the gears that are thereafter still connected to the fluid flow controlling element, an electrically operated device for operating said means when the device is operatively energized, and switching mechanism associated with the fluid flow controlling element for operatively energizing the electrically operated device and operatively deenergizing the electrically operated actuator when the fluid flow controlling element has been moved to a new position.

3. A device of the class described, comprising, in combination, a fluid flow controlling element biased to one position, a rotary electric motor, means connecting the motor and fluid flow controlling element including a reduction gear train whereby the latter may be moved to a new fluid flow controlling position against its bias by the former, an electric magnet, an armature therefor, a connection between the armature and moving means for moving the former into the magnetic field of the electric magnet when the fluid flow controlling element is moved to its new position, the electric magnet when operatively energized acting through the armature and connection to hold the fluid flow controlling element in its new position when the armature has been so moved by the moving means, and a common source of power for the motor and electric magnet whereby the biased fluid flow controlling element moves to its first position upon a failure of the common source of power.

4. A device of the class described, comprising, in combination, a fluid flow controlling element biased to minimum flow position, a rotary electrical motor, a reduction gear train including a plurality of intermeshing gears, an operative connection between one of the end gears and the rotary electrical motor, a laterally extending projection on the other end gear of the reduction gear train, said projection being spaced from the axis of rotation thereof, and a linkage system connected to the fluid flow controlling element and having a portion in the path of movement of the projection to form an operative connection between the fluid flow controlling element and the rotary electrical motor whereby the former may be moved to maximum flow position by the latter.

5. A device of the class described, comprising, in combination, a fluid flow controlling element biased to minimum flow position, a rotary electrical motor, a reduction gear train including a plurality of intermeshing gears, an operative connection between one of the end gears and the rotary electrical motor, a laterally extending projection on the other end gear of the reduction gear train, said projection being spaced from the axis of rotation thereof, a linkage system connected to the fluid flow controlling element and having a portion in the path of movement of the projection to form an operative connection between the fluid flow controlling element and the rotary electrical motor whereby the former may be moved to maximum flow position by the latter, means for maintaining the fluid flow controlling element in its maximum flow position against its bias after the motor is operatively deenergized, an electric magnet for operating said means and switching mechanism operated by said linkage system for operatively deenergizing the motor and operatively energizing the magnet when the fluid flow controlling element has been moved to its maximum flow position.

6. A device of the class described, comprising, in combination, a fluid flow controlling element biased to minimum flow position, a control casing associated with the fluid flow controlling element, a reciprocatory stem having one of its ends operatively connected to the fluid flow controlling element and its other end extending into and terminating within the control casing, a lever pivoted within the control casing, one end of the lever terminating within the control casing and its other end extending without the control casing whereby the lever may be utilized to operate an auxiliary device, means connecting said lever to said stem, an electrical actuator, a reduction gear train comprising a plurality of intermeshing gears one of which is operatively connected to the actuator, a lateral projection on another of said gears and spaced from the axis of rotation thereof, a linkage connected to said lever near that end which terminates within the control casing and having a portion engageable by said lateral projection, and a manually operable latch cooperative with the lever for latching the fluid flow controlling element in an intermediate flow position when manually moved to such position by manipulation of the extended end of said lever.

7. A device of the class described, comprising, in combination, a valve biased to closed position, a rotary electrical motor including a rotor shaft, a rotor thereon and a pinion secured thereto, a reduction gearing connecting the pinion to the valve, electrically operated means for moving said rotor shaft in a direction to move the pinion out of engagement with the reduction gear train and to hold said reduction gear train against rotation, and switching mechanism associated with the valve for operatively deenergizing the motor and operatively energizing the electrically operated means when the valve has been moved to open position by the motor.

8. A device of the class described, comprising, in combination, a valve biased to closed position, a rotary electrical motor including a rotor shaft, a rotor thereon and a pinion secured thereto, a reduction gearing connecting the pinion to the valve, movable means for engaging the rotor shaft to disengage the pinion from the reduction gear train and for engaging the reduction gear train to prevent rotation thereof, an electric magnet for operating said means, and switching mechanism associated with the valve for operatively energizing the electric magnet and operatively deenergizing the motor when the valve has been moved to open position by the motor.

9. A device of the class described, comprising, in combination, a valve biased to closed position, a rotary electrical motor, a reduction gear train connecting the former to the latter, an electric magnet for latching the valve in open position when moved to such position by the motor, and a snap-action switching mechanism operated as a result of moving the valve from closed to open position for rapidly transferring a source of power from the motor to the magnet.

10. A device of the class described, comprising, in combination, a valve biased to closed position, a rotary electrical motor for opening the valve against its bias, said motor including a rotor shaft and a rotor secured thereto, a brake disc adjacent the rotor, an electric magnet adapted on operative energization to move the rotor into engagement with the brake disc, and switching mechanism associated with the valve for operatively energizing the magnet and operatively deenergizing the motor when the latter has moved the valve to open position.

11. A device of the class described, comprising, in combination, a valve disc, a coiled spring biasing the same to closed position, a control casing associated with the valve disc, a valve stem one end of which is connected to the valve disc and the other end of which extends into and terminates within the control casing, a lever pivoted within the control casing, one end of the lever extending without the control casing whereby it may be utilized to operate an auxiliary device and the other end thereof terminating within the control casing, a member connecting the valve stem to the lever between its pivotal point and that end which terminates within the control casing, a link connected to that end of the lever that terminates within the control casing, a rotary electrical motor, a reduction gear train connected thereto, and a one-way connection between the link and gear train.

12. A device of the class described, comprising, in combination, a fluid flow controlling element biased to one position, a rotary electrical motor, a reduction gear train connecting the motor to the fluid flow controlling element, an electric magnet removed from the motor whereby the heat generated by the former will not be directly transmitted to the bearings of the latter, means operated by the magnet for maintaining the fluid flow controlling element in a new position against its bias when moved thereto by the motor, and switching mechanism associated with the fluid flow controlling element for operatively energizing the magnet and operatively deenergizing the motor when the fluid flow controlling element has been moved to its new position.

13. A device of the class described, comprising, in combination, a fluid flow controlling element biased to one position, a motor including a rotor, a field and a field coil, a pinion connected to the rotor, a reduction gear train connecting the pinion to the fluid flow controlling element whereby the latter may be moved to a new position upon operative energization of the field coil, means for moving said pinion out of operative engagement with the reduction gear train and out of alignment with the motor field and for preventing reverse rotation of the gear train by the biased fluid flow controlling mechanism, an electrically controlled device for operating said means, and switching mechanism associated with the fluid flow controlling element for operatively energizing the electrically controlled device and operatively deenergizing the field coil, the magnetic flux issuing from said motor field and traversing the motor rotor serving to move the rotor into alignment therewith to re-engage the pinion with the reduction gear train upon subsequent operative energization of the field coil.

14. A device of the class described, comprising, in combination, a valve biased to closed position, a rotary electrical motor for opening the valve against its bias, said motor including a rotor shaft and a rotor secured thereto, a member having a braking surface adjacent the rotor, electrically operated means effective to move the rotor into engagement with the braking surface when energized, and switching mechanism associated with the valve for operatively deenergizing the motor and for operatively energizing the rotor moving means when the latter has moved the valve to open position.

15. A device of the class described, comprising in combination, a fluid flow controlling element biased to one flow controlling position, a lever, means pivotally mounting the same, means connecting said lever to said fluid flow controlling element at a point spaced from the pivot point of said lever, a power operated actuator, a reduction gear train connected to said actuator, means including a one way connection connecting said gear train to said lever at a point spaced from the point at which said fluid controlling element is connected to said lever so that upon power being supplied to said actuator, said fluid flow controlling element is moved to a second flow controlling position, said lever being provided with a portion adapted to be manually operated to permit said fluid flow controlling element to be manually moved to substantially said second flow controlling position upon power failure, said one way connection permitting such movement without movement of said gear train and actuator, and a manually operable latch cooperative with said lever for latching the fluid flow controlling element in said last named position.

16. A device of the class described, comprising in combination, a valve biased to closed position, operating means movable in one direction for opening said valve against its bias, said valve moving the operating means in the opposite direction on movement of the valve to closed position due to its bias, the valve operating means having sufficient mass and being moved at such a rate of speed through a large enough range during valve closing movement, that the resulting momentum would be sufficient to cause the valve to rebound from closed position upon reaching the same, and a one way connection between the valve and operating means for allowing unrestricted continued motion of the latter in valve closing direction after the valve has closed, said one way connection comprising a member associated with said actuator and movable thereby, which member has a projection extending therefrom, and a member associated with said valve and having a hook portion lying in the path of movement of said projection.

17. A device of the class described comprising, in combination, a fluid flow controlling element biased to one flow controlling position, a lever, means connecting said lever to said fluid flow controlling element at a point spaced from the pivot point of said lever, a power operated actuator, a reduction gear train, a connection between said actuator and one end gear of said gear train, a connection between said lever and the other end gear of said gear train comprising a pin on said end gear and a member connected to said lever and having a hook portion engaging said pin upon rotation of said gear train due to power being supplied to said actuator so as to move said fluid flow controlling element to a second position against said bias, the bias of the valve being sufficient to return said element to said first position and rotate the actuator and gear train in the reverse direction, said connection between said lever and said last named end gear permitting continued rotation of said actuator and gear train until the momentum thereof is expended.

18. A device of the class described, comprising, in combination, an element to be actuated, said element being biased in one direction to a predetermined position, an electrically operated actuator, a plurality of intermeshing gears operatively connecting said element to said actuator whereby the former is moved in the opposite direction against its bias upon energization of the latter, means for unmeshing two of said gears and preventing rotation of the gears that are thereafter still connected to said element, an electrically operated device for operating said means when the device is operatively energized, and switching mechanism associated with the fluid flow controlling element for operatively energizing the electrically operated device and operatively deenergizing the electrically operated actuator when the element has been actuated to a desired new position.

19. A device of the class described, comprising, in combination, an element to be actuated, said element being biased in one direction to a predetermined position, a rotary electrical motor including a rotor shaft, a rotor thereon and a pinion secured thereto, a reduction gear train connecting said pinion to said element, electrically operated means for moving said rotor shaft in a direction to move the pinion out of engagement with the reduction gear train and to hold said reduction gear train against rotation, and switching mechanism for operatively deenergizing the motor and operatively energizing the electrically operated means when the element has been moved to a desired new position by the motor.

CARL G. KRONMILLER.